United States Patent
Hughes et al.

(10) Patent No.: US 9,489,819 B2
(45) Date of Patent: Nov. 8, 2016

(54) PERSONAL MONITOR AND TRACKING SYSTEM

(71) Applicants: Linda Hughes, Tucker, GA (US); Kyle Merrigan, Marietta, GA (US); Jim Michael, Tucker, GA (US); Steve Shepherd, Bradenton, FL (US); Suhail Warsi, Lilbum, GA (US); Renee Baker, Atlanta, GA (US)

(72) Inventors: Linda Hughes, Tucker, GA (US); Kyle Merrigan, Marietta, GA (US); Jim Michael, Tucker, GA (US); Steve Shepherd, Bradenton, FL (US); Suhail Warsi, Lilbum, GA (US); Renee Baker, Atlanta, GA (US)

(73) Assignee: AnyTransactions, Inc., Decatur, GA (US)

( * ) Notice: Subject to any disclaimer, the term of this patent is extended or adjusted under 35 U.S.C. 154(b) by 133 days.

(21) Appl. No.: 14/549,913

(22) Filed: Nov. 21, 2014

(65) Prior Publication Data
US 2016/0110987 A1    Apr. 21, 2016

Related U.S. Application Data

(60) Provisional application No. 62/066,728, filed on Oct. 21, 2014.

(51) Int. Cl.
G08B 23/00 (2006.01)
G08B 21/22 (2006.01)
H04W 4/02 (2009.01)

(52) U.S. Cl.
CPC ............... *G08B 21/22* (2013.01); *H04W 4/02* (2013.01)

(58) Field of Classification Search
CPC G08B 21/22; G08B 21/028; G08B 21/0269; G08B 1/08; H04W 4/02; G06Q 10/08; G07C 9/00111

USPC .............. 340/539.13, 539.1, 539.14, 539.15, 340/573.1, 573.4; 455/69
See application file for complete search history.

(56) References Cited

U.S. PATENT DOCUMENTS

| | | | |
|---|---|---|---|
| 5,982,281 A | 11/1999 | Layson, Jr. | |
| 6,397,256 B1 * | 5/2002 | Chan | G06F 17/30873 707/E17.111 |
| 6,639,516 B1 | 10/2003 | Copley | |
| 6,889,135 B2 | 5/2005 | Curatolo et al. | |
| 7,123,141 B2 | 10/2006 | Contestabile | |
| 7,522,060 B1 | 4/2009 | Tumperi et al. | |

(Continued)

OTHER PUBLICATIONS

WIPO: "Notification of Transmittal of the International Search Report and the Written Opinion of the International Searching Authority, or the Declaration"; Apr. 1, 2016.

*Primary Examiner* — Anh V La
(74) *Attorney, Agent, or Firm* — Bryan W. Bockhop; Bockhop Intellectual Property Law, LLC

(57) ABSTRACT

In a method for tracking an offender in possession of a first offender cellular telephone that includes a global positioning system module and for presenting tracking information about first offender to an officer employing an officer communication device, a voiceprint from the first offender is stored on the tangible memory storage device at a server. A set of predetermined location criteria is generated for the first offender. Location data from the cellular telephone are received at the server and include an indication of a location of the telephone. Offender voice sample data are compared to the voiceprint. An alert is generated when the voice sample fails to match the voiceprint. The offender's location is compared to location criteria for the offender and an alert is generated when the location is inconsistent with predetermined location criteria. The alert is transmitted to the officer communication device.

48 Claims, 7 Drawing Sheets

(56) References Cited

U.S. PATENT DOCUMENTS

| | | |
|---|---|---|
| 8,023,895 B2 | 9/2011 | Smith |
| 8,102,316 B1 | 1/2012 | Brucker et al. |
| 8,116,723 B2 | 2/2012 | Kaltsukis |
| 8,489,113 B2 | 7/2013 | Walter et al. |
| 8,761,360 B1 | 6/2014 | Gongaware et al. |
| 2005/0040944 A1* | 2/2005 | Contestabile ...... G08B 21/0269 340/539.13 |
| 2006/0020459 A1* | 1/2006 | Carter ................ G07C 9/00158 704/246 |
| 2007/0273537 A1 | 11/2007 | Crespo et al. |
| 2008/0012761 A1* | 1/2008 | Derrick .................. G01S 19/34 342/357.74 |
| 2008/0108370 A1 | 5/2008 | Aninye |
| 2010/0279627 A1* | 11/2010 | Bradley ................ H04W 48/04 455/69 |
| 2012/0050101 A1 | 3/2012 | Whiteman |
| 2012/0050532 A1 | 3/2012 | Rhyins |
| 2013/0339436 A1 | 12/2013 | Gray |
| 2014/0136609 A1 | 5/2014 | Churchill et al. |
| 2014/0188384 A1* | 7/2014 | Wolfe ............... G06F 17/30241 701/519 |
| 2014/0278212 A1 | 9/2014 | Torgersrud et al. |

* cited by examiner

PERSONAL MONITOR AND TRACKING SYSTEM

CROSS-REFERENCE TO RELATED APPLICATION(S)

This application claims the benefit of U.S. Provisional Patent Application Ser. No. 62/066,728, filed Oct. 21, 2014, the entirety of which is hereby incorporated herein by reference.

BACKGROUND OF THE INVENTION

1. Field of the Invention

The present invention relates to systems for monitoring individuals and, more specifically for a system for monitoring parolees and healthcare employees.

2. Description of the Related Art

One common way of monitoring the location of individuals under parole is by requiring them to wear an ankle monitor. An ankle monitor is a device that is typically worn around the individual's ankle and that cannot be taken off except by a monitoring officer. Periodically, such monitors transmit a location signal to a central server. The central server is monitored by an officer, who is alerted when the individual is at a location outside of a zone in which the individual is authorized to be. Most ankle monitors employ global positioning satellite (GPS) locating electronics and a radio transceiver that transmits the location to the server.

Because of the power necessary to send a signal to a remote server, many ankle monitoring systems are paired with a repeater transmitter that re-transmits the signal from the ankle monitor to the server. The repeater transmitter is typically kept at the individual's house or other authorized location.

The use of repeater transmitters can limit the mobility of offenders because they must always be within range of a repeater transmitter. However, it is sometimes desirable with offenders to allow them to travel to several different locations that typically do not have repeater transmitters. For example, it is desirable for certain offenders to attend a technical college, to go work, or to perform community service, and each of these locations are unlikely to have repeater transmitters installed.

Additionally, wearing an ankle monitor can be uncomfortable. Additionally, an ankle monitor can be hard to hide with normal clothing, which can cause unnecessary embarrassment to individuals who are required to wear them and unnecessary concern to surrounding people.

Certain types of workers, such as home health care workers, must also be monitored regularly to ensure that they visit their designated treatment locations at the times they are designated to do so. Given the negative connotation associated with ankle monitors, such monitors are not suitable for tracking such workers.

Therefore, there is a need for a system for tracking individuals that can be employed without requiring a repeater transmitter.

There is also a need for a system for tracking individuals that do not require use of an ankle monitor.

SUMMARY OF THE INVENTION

The disadvantages of the prior art are overcome by the present invention which, in one aspect, is a method for tracking a first offender in possession of a first offender cellular telephone that includes a global positioning system module and for presenting tracking information about the first offender to an officer employing an officer communication device. The first offender cellular telephone and the officer communication device are in communication with a central monitoring server that employs a tangible memory storage device. A voiceprint from the first offender is stored on the tangible memory storage device at the central monitoring server. A set of predetermined location criteria is generated for the first offender. The predetermined location criteria are stored on the tangible memory storage device at the central monitoring server. First offender location data from the first offender cellular telephone are received at the central monitoring server. The first offender location data include an indication of a location of the first offender cellular telephone. The first offender location data are stored on the tangible memory storage device. Offender voice sample data from the first offender cellular telephone are received at the central monitoring server. The voice sample is retrieved from the tangible memory storage device and the voice sample is compared to the voiceprint. A voiceprint alert is generated when the voice sample fails to match the voiceprint. The first offender location data are employed to determine an offender location. The predetermined location criteria are retrieved from the tangible memory storage device and the first offender location is compared to the set of predetermined location criteria for the first offender. A location violation alert is generated when the first offender location is inconsistent with the predetermined location criteria. At least one of the voiceprint alert and the location violation alert is transmitted from the central monitoring server to the officer communication device.

In another aspect, the invention is a method for tracking a worker in possession of a worker cellular telephone that includes a global positioning system module and for presenting tracking information about the worker to a supervisor employing a supervisor communication device. The worker cellular telephone and the supervisor communication device are in communication with a central monitoring server that employs a tangible memory storage device. A voiceprint from the worker is stored on the tangible memory storage device at the central monitoring server. A set of predetermined location criteria is generated for the worker. The predetermined location criteria are stored on the tangible memory storage device at the central monitoring server. Worker location data from the worker cellular telephone are received at the central monitoring server. The worker location data include an indication of a location of the worker cellular telephone. The worker location data are stored on the tangible memory storage device. Worker voice sample data from the worker cellular telephone are received at the central monitoring server. The voiceprint is received from the tangible memory storage device and compared to the voiceprint. A voiceprint alert is generated when the voice sample fails to match the voiceprint. The worker location data are employed to determine a worker location. The predetermined location criteria are retrieved from the tangible memory storage device and compared to the set of predetermined location criteria for the worker. A location violation alert is generated when the worker location is inconsistent with the predetermined location criteria. At least one of the voiceprint alert and the location violation alert is transmitted from the central monitoring server to the supervisor communication device.

In yet another aspect, the invention is a personal monitoring system for monitoring an individual in possession of a cellular telephone having a GPS capability in communication with a cellular telephone network. The cellular telephone includes a tangible cellphone memory. A central monitoring server is in communication with the cellular telephone network and includes a nonvolatile memory. The central monitoring server is configured to store a voiceprint of the individual on the nonvolatile memory; store a set of predetermined location criteria for the individual on the nonvolatile memory; periodically transmit a query to the cellular telephone to request GPS location data and a voice sample from the individual; receive, in response to the query, location data indicative of a current location of the cellular telephone and the voice sample; compare the location data to the predetermined location criteria to determine if the location data is consistent with the predetermined location criteria; compare the voice sample to the voiceprint to determine if the voice sample is consistent with the voiceprint; and generate an alert if the location data is not consistent with the predetermined location criteria or if the voice sample is not consistent with the voiceprint. An application is downloaded from the central monitoring server and stored on the cellphone memory of the cellular telephone. The application is configured to cause the cellular telephone to: notify the individual of the query; record the voice sample from the individual; detect a current location of the cellular telephone and generate location data indicative thereof; and transmit the voice sample and the location data to the central monitoring server in response to the query.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 6A-6C are a series of screens accessible by an officer or a manager.

DETAILED DESCRIPTION OF THE INVENTION

Figure 1:
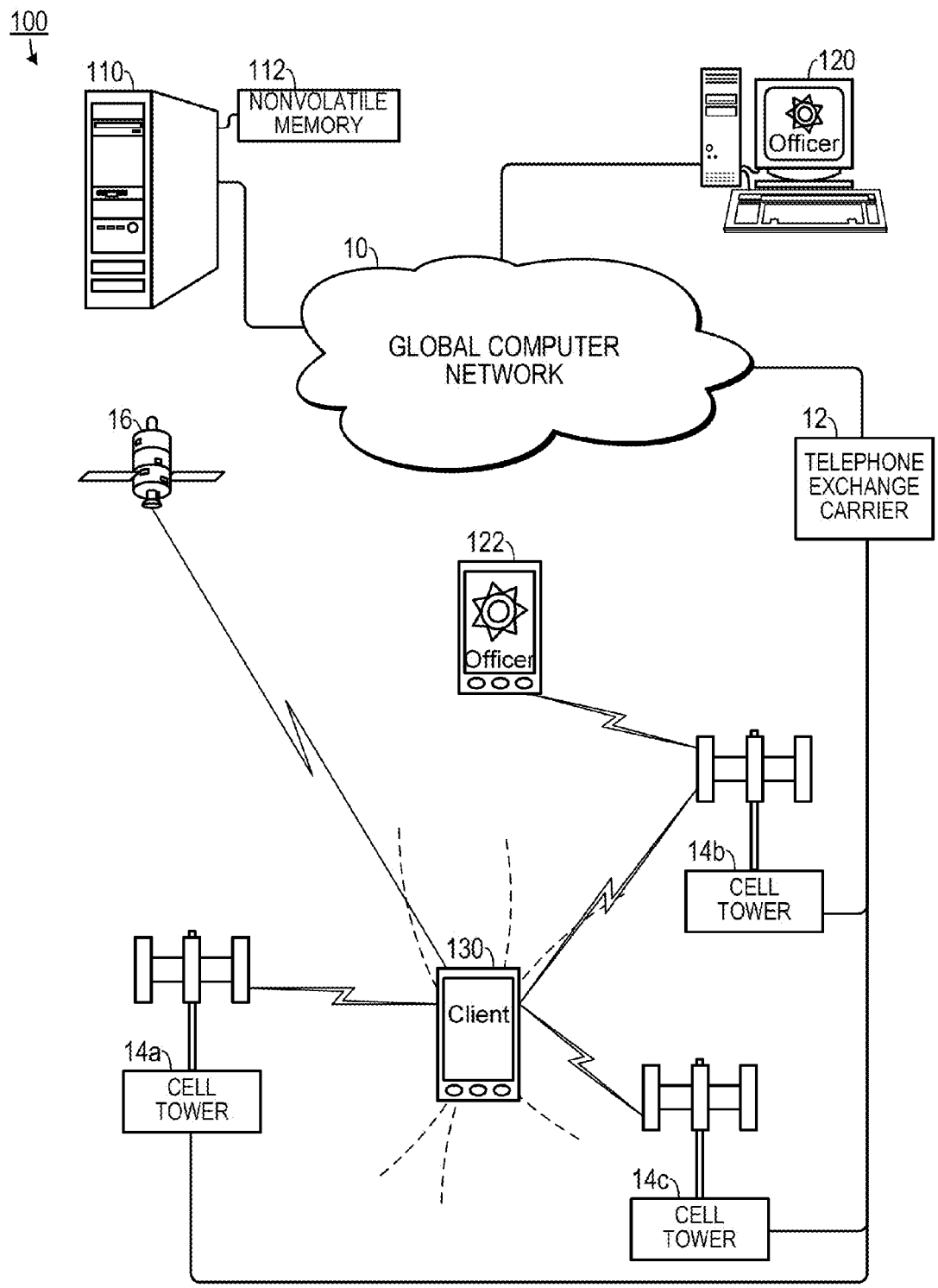
FIG. 1 is a schematic diagram of one embodiment of a personal monitoring system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

U.S. Pat. No. 7,522,060, issued to Tumperi et al., discloses methods of employing a server to track an individual and is hereby incorporated by reference.

As shown in FIG. 1, one embodiment of a personal monitoring system 100, such as a system for monitoring an offender by a probation or parole officer, includes a central monitoring server 110 that includes a nonvolatile memory 112. The central monitoring server 110 is in data communication with a global computer network 10 and a telephone exchange carrier 12. The telephone exchange carrier 12 is in communication with one or more cell towers 14a-c. The central monitoring server 110 would typically be operated by a monitoring organization such as a governmental probation agency or a mobile worker management company (such as a home healthcare company), or it would be operated by a company with which an agency would contract for use of the system's services. A person being monitored, referred to herein as the "client," (such as an offender on probation or parole, or a home healthcare worker) is in possession of a cellular telephone 130 that has circuitry necessary to acquire location data from a global positioning system (GPS) satellite 16 infrastructure. The monitored cellular telephone 130 typically can also acquire location data through cell tower triangulation.

An individual responsible for monitoring the client (such as a probation or parole officer or a healthcare system manager) would be able to communicate with the monitoring server 110 with a cellular telephone 122 or a computer 120.

Figure 2A:
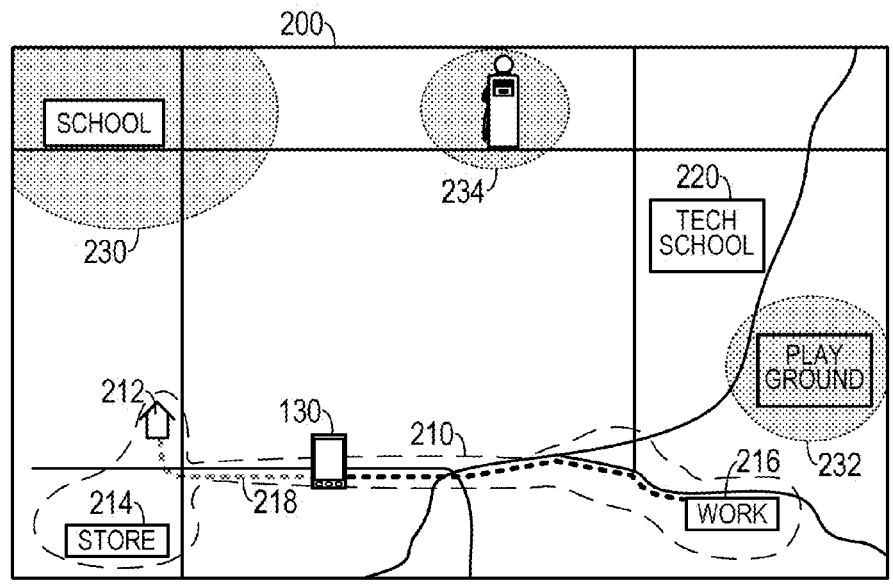
FIGS. 2A-2C is a series of maps demonstrating use of the personal monitoring system.
Figure 2B:
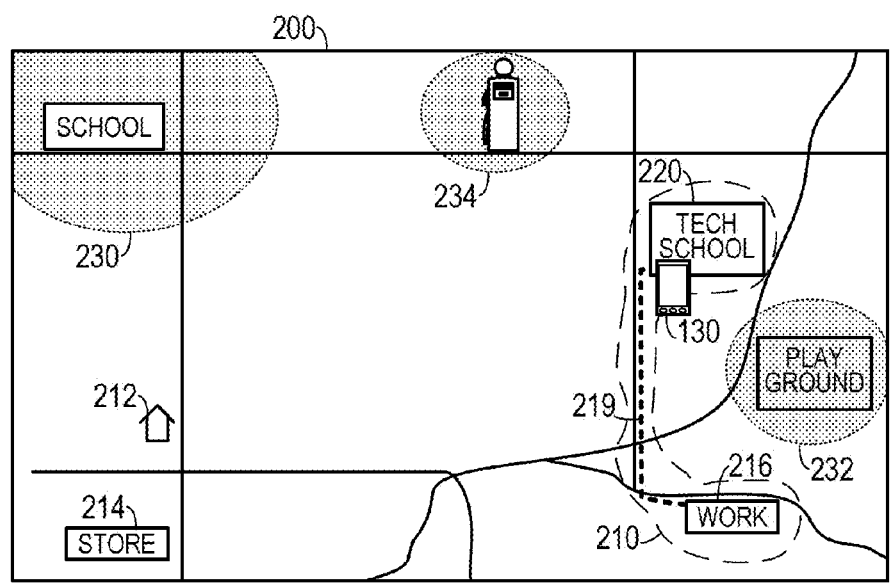
Figure 2C:
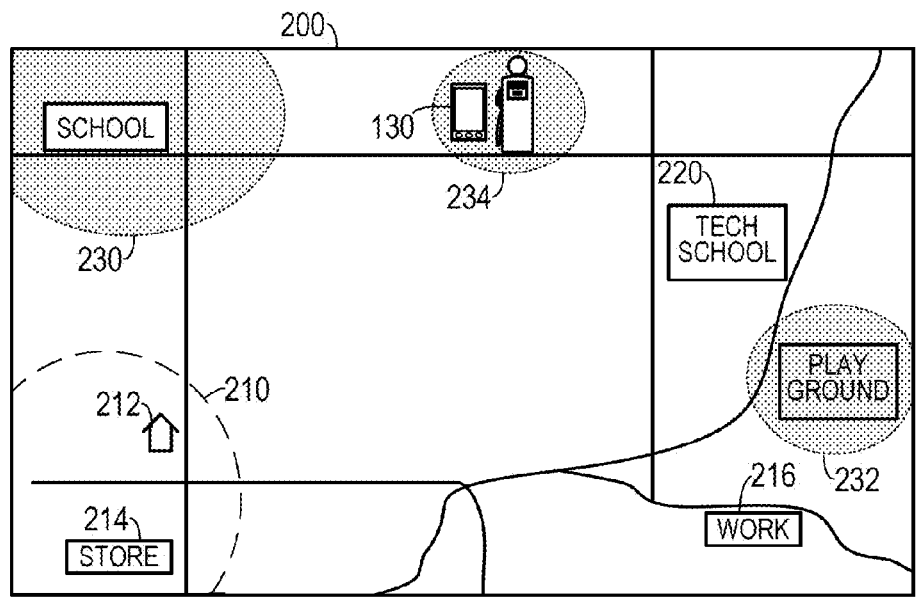

As shown in FIGS. 2A-2C, the system defines several inclusion zones, zones in which the individual is authorized to be at certain times, and exclusion zones, zones in which the individual is prohibited from being in at certain times. This example is typical for the scenario in which the system is employed to assist an officer in monitoring an offender. For example, as shown in FIG. 2A, at a certain time (e.g., during a "going to" or "coming from" work time period) an offender is authorized to be within a transit inclusion zone 210. This inclusion zone 218 could include the offender's home 212, a nearby store 214, the offender's place of work 216 and the most direct route 218 from the home 212 to the work location 216. If the system detects that the user's cellular telephone 130 is outside of the inclusion zone 210, then the system will generate an inclusion zone violation alert and transmit the alert to the officer.

Certain zones are also designated as exclusion zones. For example, if the offender is a sex offender, then the offender might be prohibited from being within a certain distance from child-oriented locations, such as schools 230 and playgrounds 232, at all times. Similarly, a drug addicted offender might be prohibited from going to a certain gasoline station 234 known as a location frequented by drug dealers. If the offender's cellular telephone 130 is detected at one of these exclusion zones, then the system will generate an exclusion zone violation alert and transmit the alert to the officer.

As shown in FIG. 2B, designation of the inclusion zone 210 (or possibly the exclusion zones) can be dynamic and based on time of day. In the FIG. 2B scenario, the system can allow the offender to go from work 216 to a school 220 at which the offender is taking classes during a specific time and along a designated route 219. At this time of day, the inclusion zone shown in FIG. 2A is no longer authorized. As shown in FIG. 2C, during an after-work and after-classes period, the inclusion zone 210 can be limited to an area around the offender's house 212 and the nearby store 214. Similar scenarios can also be effected in an application in which the client being monitored is a distributed service provider, such as a home health care worker.

Figure 3:
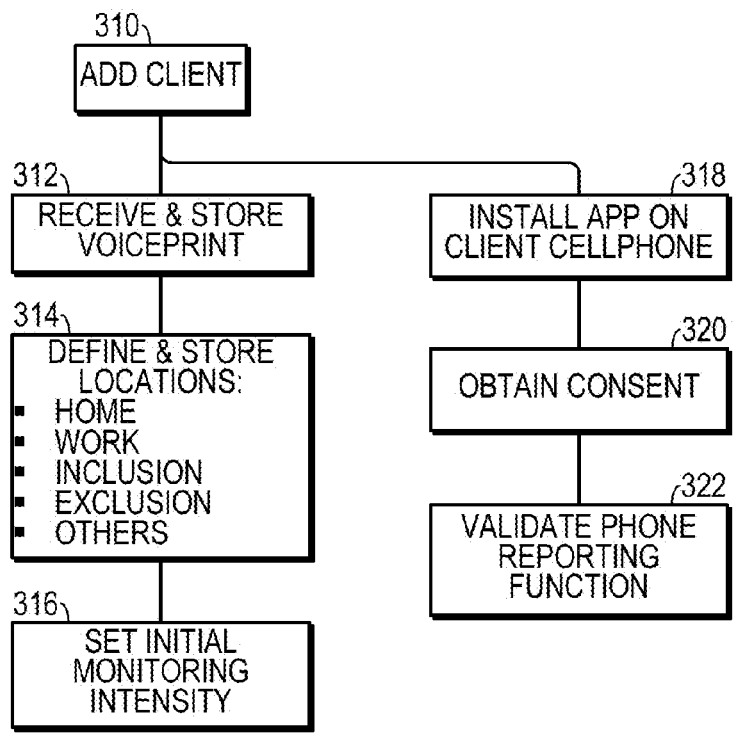
FIG. 3 is a flow chart showing activation of the personal monitoring system.

As shown in FIG. 3, when a new client (e.g., an offender or a monitored worker) is added to the system 310, usually under the instruction of the monitoring individual, the system receives and stores a voiceprint 312 from the client's cellular telephone. Typically, this would involve the client calling a number associated with the system and reading a predefined phrase over the telephone and this would be done in the presence of the officer so as to ensure that the person providing the voiceprint is the actual client and not someone else. The system can even have the client provide several samples of the phrase to as to develop a range of acceptable responses. The monitoring individual can then define several locations 314, such as home, work, inclusion zones, exclusion zones and other locations of interest. The monitoring individual can also set an initial monitoring intensity 316 (e.g., query the client's telephone every five minutes to determine its location and request a voice sample every hour, etc.). The system will then download and install the system application on the client's telephone 318. They system will also obtain consent 320 from the client for the system to monitor and control the offender's telephone according to the protocols of the client's cellular telephone service provider. Once consent has been received, the system will validate the functionality of the application on the client's telephone 322.

Upon installation, the system can be configured to perform a quality check upon installation of the application on the cellular telephone. During a predetermined period the system can determine if a series of calls have been received and determine if the cellular telephone successfully maintains GPS service. At the end of the predetermined period (e.g., a 24 hour period), a phone quality indicator can be used to determine if the client's phone is of sufficient quality to be connected to the system. This action can be done by the central monitoring server, or by an application installed on the client's phone.

Figure 4:
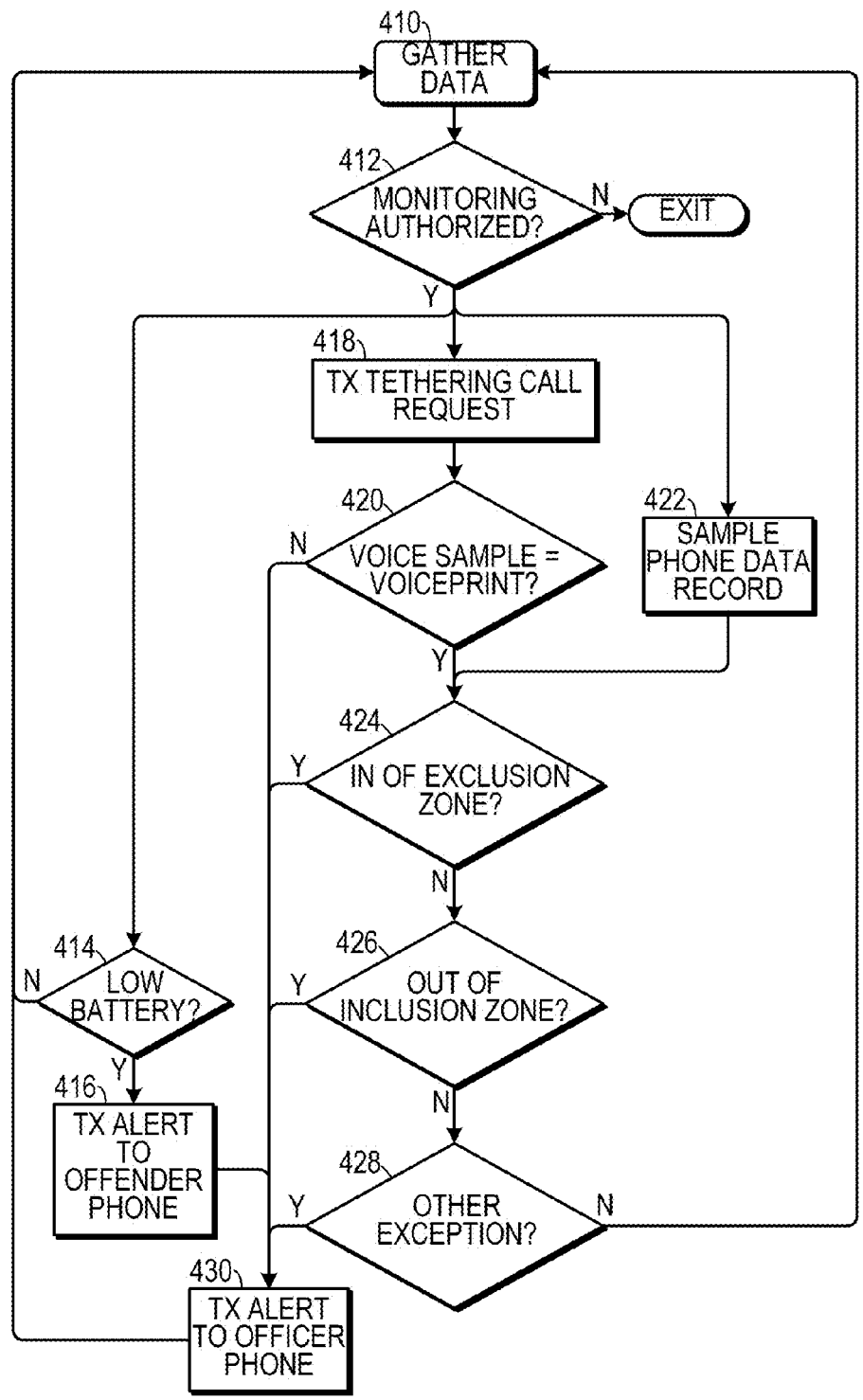
FIG. 4 is a flow chart showing operation of one embodiment of a personal monitoring system server.

As shown in FIG. 4, in normal data gathering mode 410 relative to a specific client, the system, as the monitoring system, determines if monitoring of the client is currently authorized 412, if not it will not begin monitoring the client. For example, if an offender's sentence has been completed, then the system will no longer be authorized to monitor that client. If authorized, then periodically the system will execute at least three threads of operation substantially in parallel, including detecting if the client's telephone has a low battery 414 and, if so, it will transmit a low battery alert 416 to the client and a similar alert to the monitoring individual 430. The system will also periodically transmit a tethering call request 418 to the client's cellular telephone and receive a voice sample from the client. The monitoring server will compare the voice sample to the voiceprint and, if they do not match within acceptable tolerance, the system will alert the monitoring individual 430 of the mismatch.

If the client fails to respond to a tethering call, the system can attempt to call the client several more times at a predetermined interval (for example, two more times at five minutes apart). If the client still fails to respond, the system can alert the monitoring individual, who may use the system to go to the client's last known location. Also, if the client makes changes to the telephone that would interfere with the monitoring, the monitoring individual can be notified immediately.

The system also periodically queries the client's cellular telephone to receive such data as current location data 422 (which is typically done during the tethering call and can also be done at a more frequent sampling periodicity than the tethering call frequency). From the data received from the client's cellular telephone, the system will determine if the client is in an exclusion zone 424 and, if so, it will issue an exclusion zone violation alert 430, if not, the system will determine if the client is outside of the current inclusion zone 426 and, if so, it will issue an inclusion zone violation alert 430. If not, it will determine if the client's cellular telephone indicates that any other type of exception to the conditions of the user's monitoring has occurred 428 and if so, it will issue an alert 430, otherwise it will repeat this monitoring. As will be readily understood, this is a simplification of the operations executed by the monitoring server and many other functions and routines are typically executed in this process.

Figure 5:
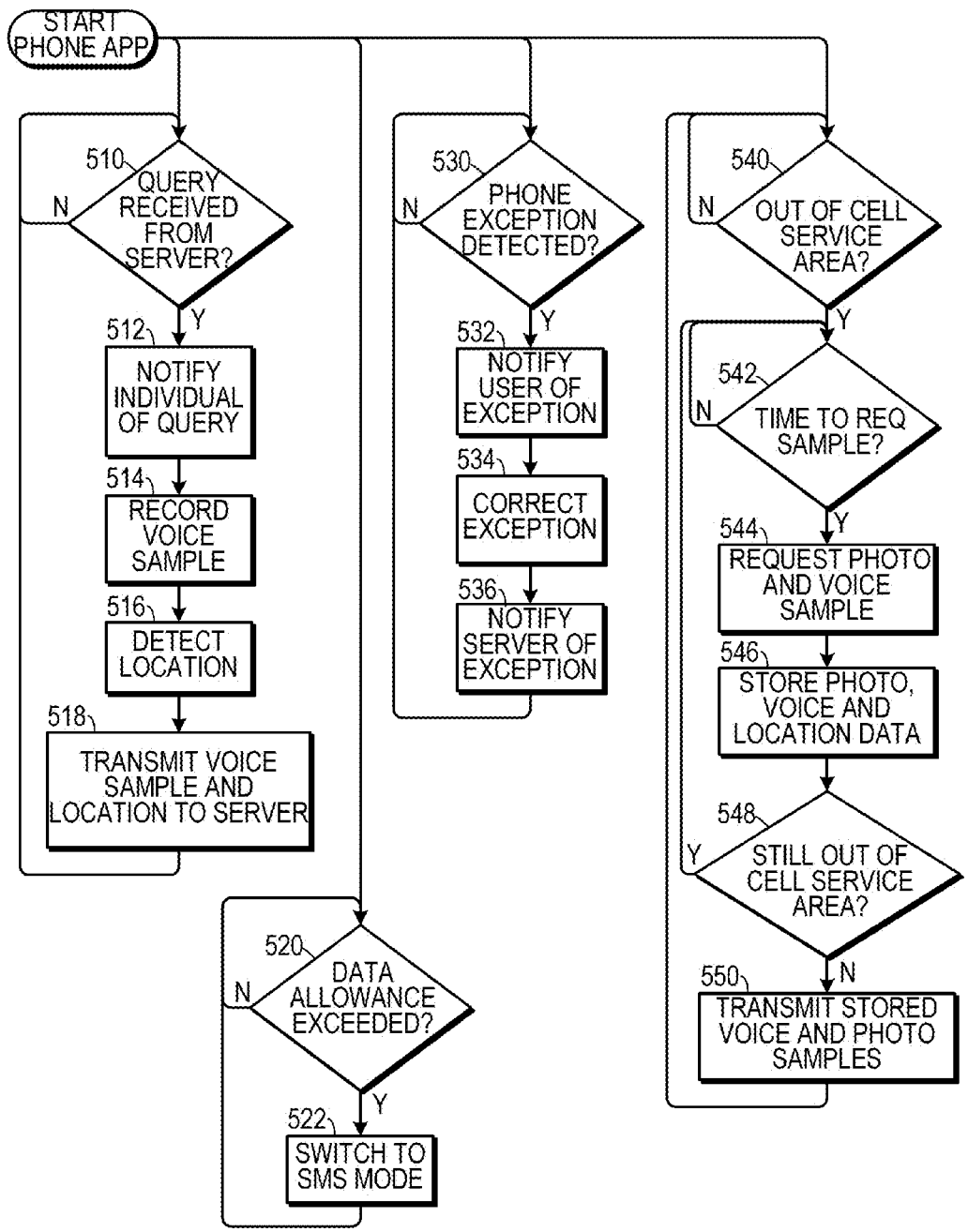
FIG. 5 is a flow chart showing operation of one embodiment of an application running on a cellular telephone used in personal monitoring.

As shown in FIG. 5, the client's cellular telephone executes several different processes, including a process used to query the client in which the cellular telephone determines if a query has been received from the monitoring server 510. If so, the cellular telephone notifies the client of the tethering call query 512, which can be done either through sounding a ring tone or through causing the telephone to vibrate (or both). The cellular telephone will then record a voice sample 514 from the user (or, alternately, it can transmit the voice sample directly to the server), it also detects its location 516 using its GPS capability, or by cell tower triangulation (or both) and then transmits 518 the voice sample and location data to the central monitoring server.

In another process, the phone application can determine if the client's data allowance has been exceeded 520 according to the client's cellular service plan. If so, it can switch its mode so that it communicates with the central monitoring server using SMS technology 522.

In another process, the phone application can detect certain exceptions 530 (for example, when the client attempts to put the phone in "airplane" mode or turn off the phone's GPS capability, etc.). When such an exception occurs, the app will cause the phone to notify the user of the exception 532 (e.g., with a text message that states "Airplane mode not authorized"), correct the exception 534 (e.g., reset the phone from airplane mode back to normal operating mode) and then notify the central monitoring server 536 of the exception.

In another process, the phone application can detect when the client's phone does not have cellular service 540 and, if so, place it in a local verification mode. In this mode, it periodically queries the user, stores the data locally and then transmits the data to the central server once cellular service is reestablished. The phone application will determine if the period to the next local query has expired 542 and, if so, it will notify the client and request 544 that the client provide both a voice sample and take a "selfie" photograph using the client's phone. The resulting voice sample and photograph are stored digitally along with timestamp data and current phone location data (typically acquired using the phone's GPS circuitry) on the cellular phone 546. The application will then detect whether the phone has regained cellular service 548 and if so, it will transmit 550 all of the stored voice, photo, location and timestamp data to the central monitoring server, which stores the data for analysis and later access. For example, the server can compare the voice samples and photographs to the client's voiceprint and a stored photograph of the client and notify the monitoring individual of any mismatches. Other methods of identifying the client may also be employed, including: fingerprint identification, retinal identification, vein mapping identification, bone mapping identification and other biometric identification.

Figures 6A, 6B:
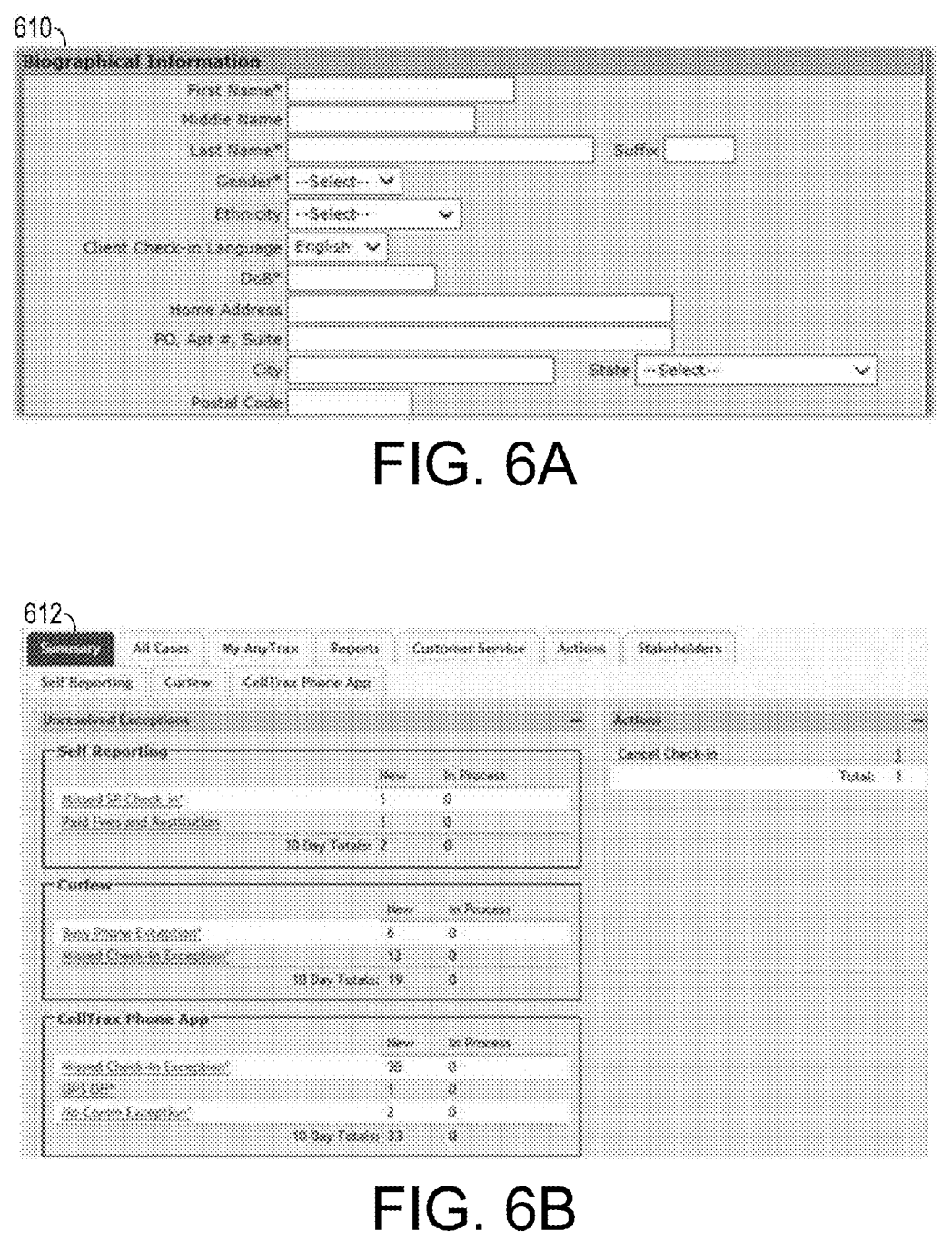
Figure 6C:
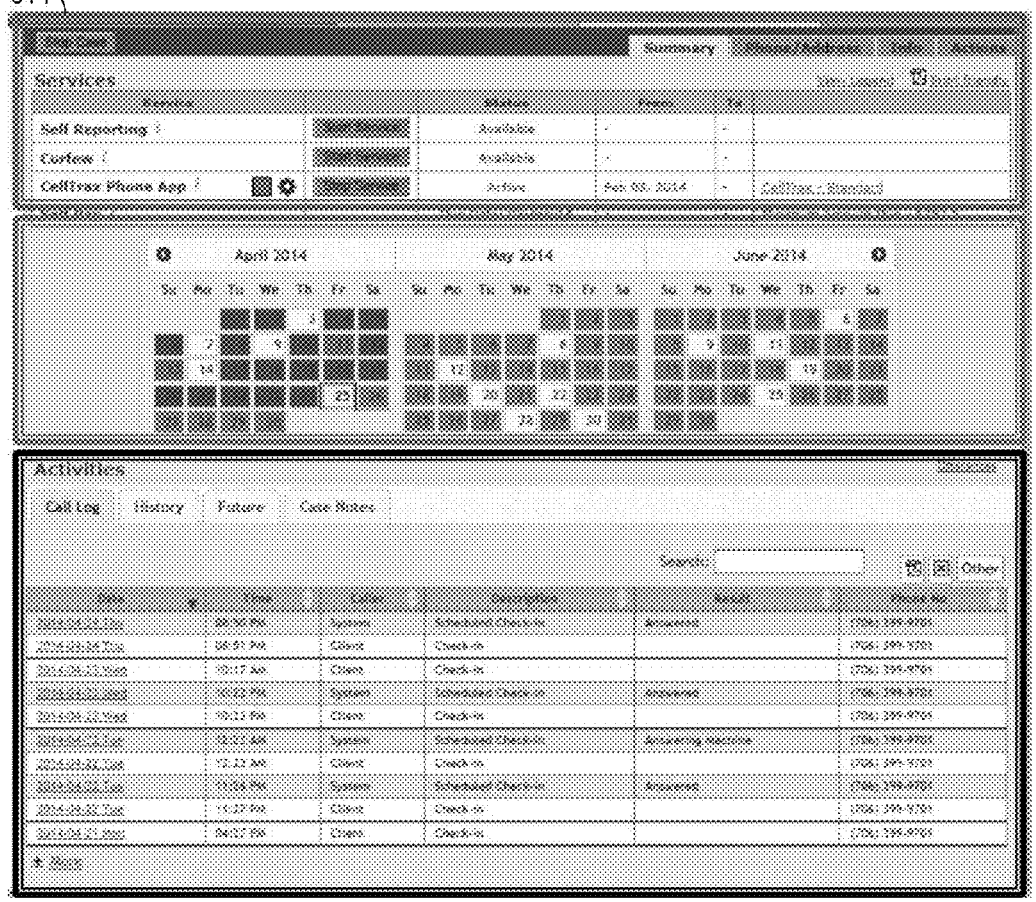

As shown in FIGS. 6A-6C the system presents several screens to the monitoring individual, which can be accessed either via a computer or the monitoring user's cellular telephone. Typically, all of the screens are accessible through a dashboard accessible by the monitoring individual. For example, FIG. 6A includes a new client input screen 610 by which the client's name, contact information and other relevant information (such as information describing the client) are input to the system. The information in this screen could be used by system to designate the client's home location.

A summary screen 612 is shown in FIG. 6B. This screen can summarize important events (e.g., exceptions, curfew compliance, etc.) associated with the client. It can also summarize parameters associated with the client's cell phone.

As shown in FIG. 6C, the dashboard can include a screen 614 that lists all actions for a particular client over time. For example, it can list the date and time of each tethering call in which the client was located. It can also list any exceptions (e.g., voice mismatch, failure to respond, etc.) detected. The monitoring individual can select a specific event and the system will display additional information, which could include a display of a map showing the client's location during the selected event. A satellite view of the location, along with the Cartesian coordinates of the location, may also be supplied to assist the monitoring individual in understanding the location of the client. This may be useful in helping an officer take action, if necessary.

A monitoring individual may also be presented with a page that lists all of the clients assigned to the individual. A symbolic summary may be presented next to each name. For example, a green box next to a client's name may indicate that the client is completely in compliance with the conditions imposed on the client, a yellow box might indicate minor exceptions associated with the client and a red box might indicate that the client has caused significant exceptions. Another symbol might act as an icon that links to a page of notes about the client. Clicking on another symbol might cause a count or a list of case actions associated with the client to appear on the screen (e.g., actions such as: placing of a tethering call, detection of the client at a new location, sending of a text, a change of alert parameters set by the monitoring individual, etc.). Also, next to the client's name can be a link showing the date and time of the last location of the client. Clicking on the link may cause the display of a map locating the client. The map can also show the path of tracked locations over a period of time, including a starting point of the client at the beginning of the period, the ending point at the end of the period and the route taken by the client during the period.

One screen can show a matrix of different time periods (e.g., one hour periods) for several different contiguous days. When a monitoring individual clicks on a specific period, the system can display a list of relevant information, including locations at which the client was detected during the period and the number and types of exceptions that occurred during the period. The periods in the matrix can be color coded to indicate, for example, that no issues were detected for the client during the period (e.g., with a green box) or that there is an unresolved exception that occurred during the period (e.g., with a red box). Similarly, other issues can be symbolically represented during a given period, such as: no issues; no locations reported for the client; existence of unresolved exceptions; airplane mode on; GPS turned off; client in inclusion zone; client in exclusion zone; client missed tethering call; client late in responding to tethering call; existence of multiple exceptions; no communication with client detected; periods during which client is to be in inclusion zone (which could be represented, for example, as a blue outline around the boxes in the inclusion zone periods); and the number of different locations detected during a given period. The dashboard will also give the monitoring individual the option of clearing exceptions for the client when the monitoring individual believes that the exceptions are acceptable. As a result, this status screen gives the monitoring individual a quick snapshot indicating the client's compliance.

One screen can show a calendar, on which expected locations for a client over time and other significant events of interest are displayed to the monitoring individual. The calendar can also be used to remind the monitoring individual of such events such as: a scheduled call, a court date at which the client is to appear, a scheduled drug test for the client, etc.

The system can also generate a location reliability assessment based on the global positioning system location data and the cellular system location data. The location reliability assessment provides an indication of reliability of the first client location, which can be useful to the monitoring individual in determining if the reported location is really a violation or just a technical anomaly (e.g., as a result of weather influences, etc.). The system can calculate the speed associated with the client's cellular telephone based on location data received from the first client cellular telephone and use the speed in determining the location reliability assessment. For example, if the client's speed is unrealistically high, it would indicate that the location data may not be reliable. Similarly, an indication of the number of different cellular towers are in communication with the client's cellular telephone can be used in the reliability assessment, as consistent data from many different cell towers would indicate a higher level of reliability than data from a single tower.

The system can receive an indication from the client's cellular telephone that the global positioning system module has been disabled. Once received, the system can transmit a command to the client's phone causing it to enable its GPS system (this could also be done locally by the application resident on the phone). The monitoring individual can also be notified by the system of the client's attempt to disable the GPS module. The system (or the local application of the phone) can handle an attempt by the client to place the phone in airplane mode in a similar manner.

The system can receive data about operational parameters of the client's cellular telephone (e.g., low battery life remaining, high data error rate, etc.). If the cellular telephone is operating below a predetermined operating threshold, the client and the monitoring individual can be notified of the phone's operating state through an alert. The state can also be recorded in a log that can be accessed by the monitoring individual at a later time. The system can also alert the monitoring individual if the client attempts to disable the identification ability of the client's cellular telephone.

The system can also receive data describing a browser history for client's cellular telephone and determine if the client has attempted to access restricted web sites (e.g., pornographic cites, drug related sites, and crime-related sites, etc.). When the client has attempted to access a restricted site, the monitoring individual is alerted to the attempted access. The browser history may also be stored in a log by the system.

The system also detects when the client's telephone has employed call forwarding in responding to a tethering call (which would indicate that the client is not at the same location as the client's phone). If call forwarding is detected, the monitoring individual may be alerted. The same can be done when the client attempts to respond to a tethering call with the client's phone set up to participate in a three-way call, which might also indicate that the client is at a different location than the client's phone.

In one embodiment, the system is configured to detect when the client's phone has been at a single location for more than a predetermined period of time. Once detected, the system can initiate a tethering call to verify that the client is with the client's phone. At certain times, the system can refrain from sending tethering call requests, thereby allowing the client to sleep or to refrain from disturbing the client while at work or while in class.

The system can also receive from the monitoring individual changes to the sampling frequency based on certain events. For example, if the monitoring individual suspects the client of participating in a crime, the sampling frequency can be increased so that the monitoring individual can better track the client and record the client's locations with high precision, which can be used in evidence at a later time. On the other hand, the monitoring can reduce sampling frequency (thereby saving battery life) if the client has been fully compliant for a long period of time. The system can also automatically adjust sampling frequency based on past behavior of the client. For example, if the client is detected as being mobile, the sampling frequency can be increased so as to provide a more precise record of the route taken by the client. If the monitoring individual issues a current location request for the client, the system can query the client's phone and provide an immediate current location.

In one embodiment, the system can determine when the client's phone is within a predetermined distance from another client's phone and then alert the monitoring individual of the proximity. This can be useful, for example, when the first client is a drug addict and when the second client is a known drug dealer. The system can also detect when the client is within a predetermined distance from a location or event, such as a known hang-out for drug users or a location of a robbery.

When monitoring of the client cellular telephone is no longer authorized, for example as a result of the completion of the parole period, the system will then disable the monitoring of the client's cellular telephone. This can be done automatically, thereby preventing unauthorized monitoring.

In one embodiment, the local application on the client's phone detects when a data allowance for the cellular telephone set forth in a cellular service plan subscribed to by the client has been exceeded and causes the phone to communicate with the central monitoring server via SMS technology when the data allowance has been exceeded. In one embodiment, the local application monitors operating parameters and management of the telephone, including loading updates to the local application as they become available. The application that monitors the performance of the primary app, reports on the performance to the server, and downloads new versions or replaces the current version of the app on the phone.

In one embodiment, the system records all exceptions associated with a client over a predetermined period and then generates a behavior rating for the client. The client may be assigned a positive rating when the plurality of exceptions are less than a predetermined threshold and assigned a negative rating when the plurality of exceptions exceed a predetermined threshold. This can be used by the monitoring individual in deciding how lenient to be with the client. The system can also be operated in a low intensity mode if the monitoring individual so desires. This can be done in the case of clients with a good behavior rating so as to conserve battery life. For example, in this mode a client can be sent a tethering call only once a week as opposed to every half hour.

In one embodiment, the system records a plurality of telephone operational parameters indicative of a functionality state of the cellular telephone during a predetermined period after installation of the application on the cellular telephone. Based on the recorded information, the system generates a phone rating in which the cellular telephone is assigned a positive rating when the functionality state is greater than a predetermined threshold and in which the cellular telephone is assigned a negative rating when the functionality state is less than the predetermined threshold. This can be used by the monitoring individual to instruct the client to buy a new telephone.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for tracking a first offender in possession of a first offender cellular telephone that includes a global positioning system module and for presenting tracking information about the first offender to an officer employing an officer communication device, in which the first offender cellular telephone and the officer communication device are in communication with a central monitoring server that employs a tangible memory storage device, comprising the steps of:
  (a) storing a voiceprint from the first offender on the tangible memory storage device at the central monitoring server;
  (b) generating a set of predetermined location criteria for the first offender and storing the predetermined location criteria on the tangible memory storage device at the central monitoring server;
  (c) receiving, at the central monitoring server, a first offender location from the first offender cellular telephone and storing the first offender location on the tangible memory storage device;
  (d) receiving, at the central monitoring server, a voice sample from the first offender cellular telephone;
  (e) retrieving the voiceprint from the tangible memory storage device and comparing the voice sample to the voiceprint and generating a voiceprint alert when the voice sample fails to match the voiceprint;
  (f) retrieving the predetermined location criteria from the tangible memory storage device and comparing the first offender location to the set of predetermined location criteria for the first offender and generating a location violation alert when the first offender location is inconsistent with the predetermined location criteria; and (g) transmitting at least one of the voiceprint alert and the location violation alert from the central monitoring server to the officer communication device;

(h) receiving an airplane mode indication from the first offender cellular telephone that the first offender cellular telephone has placed in airplane mode; and (i) transmitting a command in response to the airplane mode indication to the first offender cellular telephone causing the first offender cellular telephone to cease from being in airplane mode.

2. The method of claim 1, further comprising the step of generating the predetermined location criteria so as to include at least one location zone corresponding to:

(a) a home location at which the first offender resides; and (b) a work location associated at which the first offender is employed.

3. The method of claim 1, further comprising the step of generating the predetermined location criteria so as to include at least one location zone corresponding to at least one inclusion location at which the first offender is authorized to be.

4. The method of claim 1, further comprising the step of generating the predetermined location criteria so as to include at least one location zone corresponding to at least one exclusion location at which the first offender is forbidden to be.

5. The method of claim 2, wherein the step of generating the predetermined location criteria further comprises the step determining a time schedule that sets forth time periods during which the first offender is authorized to be at the each selected location zone.

6. The method of claim 1, wherein the location data includes global positioning system location data and cellular system location data and further comprising the steps of:

(a) generating a location reliability assessment based on the global positioning system location data and the cellular system location data, the location reliability assessment providing an indication of reliability of the first offender location; and (b) transmitting to the officer communication device an indication of the location reliability assessment.

7. The method of claim 6, further comprising the step of calculating a speed associated with the first offender cellular telephone based on location data received from the first offender cellular telephone and wherein the speed is used in determining the location reliability assessment.

8. The method of claim 6, further comprising the steps of:

(a) detecting how many different cellular towers are in communication with the first offender cellular telephone; and (b) using information about how many different cellular towers are in communication with the first offender cellular telephone in determining the location reliability assessment.

9. The method of claim 1, further comprising the steps of:

(a) receiving a GPS disabled indication from the first offender cellular telephone that the first offender cellular telephone has disabled the global positioning system module; and (b) transmitting a command to the first offender cellular telephone causing the first offender cellular telephone to enable the global positioning system module in response to the GPS disabled indication.

10. The method of claim 1, further comprising the steps of:

(a) receiving data about operational parameters of the first offender cellular telephone;

(b) determining if an operational parameter is below a predetermined operating threshold; and (c) transmitting to the first offender cellular telephone an operational parameter alert when the operational parameter is below the predetermined operating threshold.

11. The method of claim 10, wherein the operational parameter alert comprises a battery life projection.

12. The method of claim 10, further comprising the step of transmitting the operational parameter alert to the officer communication device.

13. The method of claim 1, further comprising the step of transmitting an ID disabled alert to the officer communication device upon detecting that identification of the first offender cellular telephone has been disabled.

14. The method of claim 1, further comprising the steps of:

(a) according to a predetermined schedule, transmitting to the first offender cellular telephone a tethering call; and (b) in response to the tethering call, receiving from the first offender cellular telephone a voice sample.

15. The method of claim 1, further comprising the steps of:

(a) receiving data describing a browser history for the first offender cellular telephone;

(b) comparing the browser history to a list of restricted sites; and (c) transmitting a restricted site alert to the officer communication device when the browser history indicates that the first offender has accessed a restricted site.

16. The method of claim 1, further comprising the steps of:

(a) detecting when the first offender cellular telephone has employed call forwarding; and (b) transmitting a call forwarding alert to the officer communication device upon detecting when the first offender cellular telephone has employed call forwarding.

17. The method of claim 1, further comprising the steps of:

(a) detecting when the first offender cellular telephone has engaged in a three-way call; and (b) transmitting a three-way call alert to the officer communication device upon detecting when the first offender cellular telephone has engaged in a three-way call.

18. The method of claim 1, further comprising the step of transmitting to the first offender cellular telephone a tethering call when the first offender cellular telephone has been at a predetermined location for more than a predetermined amount of time, thereby verifying that the first offender is with the first offender cellular telephone.

19. The method of claim 18, wherein the cellular telephone a tethering call requires the first offender to provide a voice sample.

20. The method of claim 1, further comprising the steps of:

(a) receiving a location sampling frequency change request from the officer communication device that indicates a desired location sampling frequency for the first offender cellular telephone;

(b) changing a sampling frequency of the first offender cellular telephone to the desired location sampling frequency.

21. The method of claim 1, further comprising the step of changing a sampling frequency of the first offender cellular telephone based on a system request.

22. The method of claim 20, further comprising the steps of:
(a) determining whether the first offender cellular telephone is stationary or moving; and
(b) adjusting the sampling frequency so as to have a higher sampling frequency when the first offender cellular telephone is moving than when the first offender cellular telephone is stationary.

23. The method of claim 1, further comprising the steps of:
(a) receiving an offender location request from the officer communication device;
(b) in response to the first offender location request, querying the first offender cellular telephone for current location data for the first offender; and
(c) after receiving the current location data for the first offender, transmitting the current offender location data to the officer communication device.

24. The method of claim 1, further comprising the step of:
(a) determining when the first offender cellular telephone is within a predefined proximity of a second offender cellular telephone, different from the first offender cellular telephone; and
(b) transmitting to the officer communication device a two offender proximity indication when the first offender cellular telephone is within the predefined proximity of the second offender cellular telephone.

25. The method of claim 1, further comprising the steps of:
(a) determining when the first offender cellular telephone is within a predefined proximity of an event location; and
(b) transmitting to the officer communication device a location proximity indication when the first offender cellular telephone is within the predefined proximity of the event location.

26. The method of claim 1, further comprising the steps of:
(a) determining when monitoring of the first offender cellular telephone is no longer authorized; and
(b) disabling monitoring of the first offender cellular telephone when monitoring is no longer authorized.

27. A method for tracking a worker in possession of a worker cellular telephone that includes a global positioning system module and for presenting tracking information about the worker to a supervisor employing a supervisor communication device, in which the worker cellular telephone and the supervisor communication device are in communication with a central monitoring server that employs a tangible memory storage device, comprising the steps of:
(a) storing a voiceprint from the worker on the tangible memory storage device at the central monitoring server;
(b) generating a set of predetermined location criteria for the worker and storing the predetermined location criteria on the tangible memory storage device at the central monitoring server;
(c) receiving, at the central monitoring server, worker location data, including both global positioning system location data and cellular system location data, from the worker cellular telephone, the worker location data including an indication of a location of the worker cellular telephone and storing the worker location data on the tangible memory storage device;
(d) receiving, at the central monitoring server, worker voice sample data from the worker cellular telephone;
(e) retrieving the voiceprint from the tangible memory storage device and comparing the voice sample to the voiceprint and generating a voiceprint alert when the voice sample fails to match the voiceprint;
(f) employing the worker location data to determine a worker location;
(g) retrieving the predetermined location criteria from the tangible memory storage device and comparing the worker location to the set of predetermined location criteria for the worker and generating a location violation alert when the worker location is inconsistent with the predetermined location criteria;
(h) transmitting at least one of the voiceprint alert and the location violation alert from the central monitoring server to the supervisor communication device;
(i) generating a location reliability assessment based on both the global positioning system location data and the cellular system location data, the location reliability assessment providing an indication of reliability of the worker location; and
(j) transmitting to the supervisor communication device an indication of the location reliability assessment.

28. The method of claim 27, further comprising where the step of generating the predetermined location criteria comprises the steps of:
(a) determining a plurality of locations at which the worker is required to be; and
(b) determining a time period during which the worker is required to be at each of the plurality of locations.

29. The method of claim 27, further comprising the steps of:
(a) detecting how many different cellular towers are in communication with the worker cellular telephone; and
(b) using information about how many different cellular towers are in communication with the worker cellular telephone in determining the location reliability assessment.

30. The method of claim 27, further comprising the steps of:
(a) receiving a GPS disabled indication from the worker cellular telephone that the worker cellular telephone has disabled the global positioning system module; and
(b) transmitting a command to the worker cellular telephone causing the worker cellular telephone to enable the global positioning system module in response to the GPS disabled indication.

31. The method of claim 27, further comprising the steps of:
(a) receiving an airplane mode indication from the worker cellular telephone that the worker cellular telephone has placed in airplane mode; and
(b) transmitting a command to the worker cellular telephone causing the worker cellular telephone to cease from being in airplane mode.

32. The method of claim 27, further comprising the steps of:
(a) receiving data about operational parameters of the worker cellular telephone;
(b) determining is an operational parameter is below a predetermined operating threshold; and
(c) transmitting to the worker cellular telephone an operational parameter alert when the operational parameter is below the predetermined operating threshold.

33. The method of claim 32, wherein the operational parameter alert comprises a battery life projection.

34. The method of claim 32, further comprising the step of transmitting the operational parameter alert to the supervisor communication device.

35. The method of claim 27, further comprising the step of transmitting an ID disabled alert to the supervisor communication device upon detecting that identification of the worker cellular telephone has been disabled.

36. The method of claim 27, further comprising the steps of:
(a) according to a predetermined schedule, transmitting to the worker cellular telephone a tethering call; and
(b) in response to the tethering call, receiving from the worker cellular telephone a voice sample.

37. The method of claim 27, further comprising the step of transmitting to the worker cellular telephone a tethering call when the worker cellular telephone has been at a predetermined location for more than a predetermined amount of time, thereby verifying that the worker is with the worker cellular telephone.

38. The method of claim 37, wherein the cellular telephone a tethering call requires the worker to provide a voice sample.

39. The method of claim 27, further comprising the steps of:
(a) detecting when the worker cellular telephone has employed call forwarding; and
(b) transmitting a call forwarding alert to the supervisor communication device upon detecting when the worker cellular telephone has employed call forwarding.

40. The method of claim 27, further comprising the steps of:
(a) detecting when the worker cellular telephone has engaged in a three-way call; and
(b) transmitting a three-way call alert to the supervisor communication device upon detecting when the worker cellular telephone has engaged in a three-way call.

41. The method of claim 27, further comprising the steps of:
(a) receiving a worker location request from the supervisor communication device;
(b) in response to the worker location request, querying the worker cellular telephone for current worker location data; and
(c) after receiving the current worker location data, transmitting the current worker location data to the supervisor communication device.

42. A personal monitoring system for monitoring a client in possession of a cellular telephone having a GPS capability in communication with a cellular telephone network, the cellular telephone including a tangible cellphone memory, the personal monitoring system comprising:
(a) a central monitoring server in communication with the cellular telephone network, the central monitoring server including a nonvolatile memory and configured to:
(i) store a voiceprint of the client on the nonvolatile memory;
(ii) store a set of predetermined location criteria for the client on the nonvolatile memory;
(iii) periodically transmit a query to the cellular telephone to request GPS location data and a voice sample from the client;
(iv) receive, in response to the query, location data indicative of a current location of the cellular telephone and the voice sample;
(v) compare the location data to the predetermined location criteria to determine if the location data is consistent with the predetermined location criteria;
(vi) compare the voice sample to the voiceprint to determine if the voice sample is consistent with the voiceprint; and
(vii) generate an alert if the location data is not consistent with the predetermined location criteria or if the voice sample is not consistent with the voiceprint; and
(b) an application downloaded from the central monitoring server and stored on the cellphone memory of the cellular telephone, the application configured to cause the cellular telephone to:
(i) notify the client of the query;
(ii) record the voice sample from the client;
(iii) detect a current location of the cellular telephone and generate location data indicative thereof; and
(iv) transmit the voice sample and the location data to the central monitoring server in response to the query;
(c) detect when a data allowance for the cellular telephone set forth in a cellular service plan subscribed to by the client has been exceeded; and
(d) communicate with the central monitoring server via SMS technology when the data allowance has been exceeded.

43. The personal monitoring system of claim 42, wherein the application is further configured to:
(a) when the cellular telephone does not have cellular service periodically notify the client to record the voice sample and take a self-photograph using the cellular telephone;
(b) when the client records the voice sample and takes the self-photograph, store a time and date stamped digital version of the self-photograph and the voice sample on the cellphone memory; and
(c) when the cellular telephone regains cellular service, transmit the time and date stamped digital version of the self-photograph and the voice sample to the central monitoring server via the cellular telephone network.

44. The personal monitoring system of claim 43, wherein the central monitoring server is further configured to:
(a) store a reference photograph of the client;
(b) compare the time and date stamped digital version of the self-photograph and the voice sample to the reference photograph and voiceprint; and
(c) generate an alert either when the self-photograph is inconsistent with the reference photograph or when the voice sample is inconsistent with the voiceprint.

45. The personal monitoring system of claim 42, wherein the central monitoring server is further configured to:
(a) record over a predetermined period a plurality of exceptions indicative of the client's behavior being inconsistent with a behavior plan;
(b) generate a behavior rating in which the client is assigned a positive rating when the plurality of exceptions are less than a predetermined threshold and in which the client is assigned a negative rating when the plurality of exceptions exceed a predetermined threshold.

46. The personal monitoring system of claim 42, wherein the central monitoring server is further configured to:
(a) record a plurality of telephone operational parameters indicative of a functionality state of the cellular telephone during a predetermined period after installation of the application on the cellular telephone; and (b) generate a phone rating in which the cellular telephone is assigned a positive rating when the functionality state is greater than a predetermined threshold and in which the cellular telephone is assigned a negative rating when the functionality state is less than the predetermined threshold.

47. The personal monitoring system of claim 42, wherein the application is further configured to perform a quality check upon installation of the application on the cellular telephone, in which during a predetermined period the application:

(a) determines if a series of calls have been received; and (b) determines if the cellular telephone successfully maintains GPS service, wherein at the end of the predetermined period, the application transmits to the central monitoring server a phone quality indicator.

48. The personal monitoring system of claim 47, wherein when the phone quality indicator indicates that the cellular telephone is not of sufficient quality, the central monitoring server will not allow the cellular telephone to connect with the system.

\* \* \* \* \*